United States Patent
Zhou et al.

(10) Patent No.: US 8,832,074 B2
(45) Date of Patent: Sep. 9, 2014

(54) SYSTEM, METHOD AND COMPUTER-READABLE MEDIUM FOR DYNAMIC SKEW AVOIDANCE FOR GENERIC QUERIES

(75) Inventors: Xin Zhou, Monterey Park, CA (US); Olli Pekka Kostamaa, Santa Monica, CA (US)

(73) Assignee: Teradata US, Inc., Dayton, OH (US)

( * ) Notice: Subject to any disclaimer, the term of this patent is extended or adjusted under 35 U.S.C. 154(b) by 502 days.

(21) Appl. No.: 12/582,734

(22) Filed: Oct. 21, 2009

(65) Prior Publication Data

US 2011/0093499 A1   Apr. 21, 2011

(51) Int. Cl.
G06F 17/30   (2006.01)

(52) U.S. Cl.
CPC .............. *G06F 17/30445* (2013.01); *G06F 17/30545* (2013.01)
USPC ....................................... 707/713

(58) Field of Classification Search
USPC ....................................... 707/713
See application file for complete search history.

(56) References Cited

U.S. PATENT DOCUMENTS

| | | | |
|---|---|---|---|
| 5,335,345 A * | 8/1994 | Frieder et al. | 1/1 |
| 5,742,806 A * | 4/1998 | Reiner et al. | 1/1 |
| 5,978,793 A * | 11/1999 | Kashyap et al. | 1/1 |
| 7,386,536 B1 * | 6/2008 | Ramesh et al. | 1/1 |
| 7,565,349 B2 * | 7/2009 | Beckerle et al. | 1/1 |
| 2003/0078924 A1 * | 4/2003 | Liechty et al. | 707/7 |
| 2004/0199530 A1 * | 10/2004 | Avadhanam et al. | 707/100 |
| 2008/0288563 A1 * | 11/2008 | Hinshaw et al. | 707/205 |
| 2009/0299956 A1 * | 12/2009 | Xu et al. | 707/2 |
| 2010/0088315 A1 * | 4/2010 | Netz et al. | 707/737 |

OTHER PUBLICATIONS

Dominguez-Sal et al., Cache-Aware Load Balancing for Question Answering, Oct. 2008, CIKM '08, ACM.*
Poosala et al. "Estimation of Query-Result Distribution and its Application in Parallel-Join Load Balancing." Proceedings of the 22nd VLDB Conference. Mumbai (Bombay), India, 1996.*

* cited by examiner

*Primary Examiner* — Alexey Shmatov
*Assistant Examiner* — Grace Park
(74) *Attorney, Agent, or Firm* — Steve McDonald; Ramin Mahboubiar

(57) ABSTRACT

A system, method, and computer-readable medium that facilitate dynamic skew avoidance are provided. The disclosed mechanisms advantageously do not require any statistic information regarding which values are skewed in a column on which a query is applied. Query selectivity is evaluated at a check point and thereby facilitates accurate detection of an overloaded processing module. The successful detection of an overloaded processing module causes other processing modules to stop sending more skewed rows to the overloaded processing module. Detection of an overloaded processing module is made when the overloaded processing module has received more rows than a target number of rows. Further, skewed rows that are maintained locally rather than redistributed to a detected processing module may result in more processing modules becoming overloaded. Advantageously, the disclosed mechanisms provide for a final redistribution adjustment to provide for even distribution of rows among all processing modules.

18 Claims, 7 Drawing Sheets

| Employee | Employee_No | SS_Num | Salary | Plan |
|---|---|---|---|---|
| 510a | 56789 | 111-11-1111 | 55000 | 5 |
| 510b | 12345 | 222-22-2222 | 65000 | 5 |
| 510c | 23232 | 333-33-3333 | 65000 | 2 |
| 510d | 34343 | 444-44-4444 | 70000 | 5 |
| 510e | 45454 | 555-55-5555 | 90000 | 1 |
| 510f | 56565 | 666-66-6666 | 85000 | 5 |
| 510g | 67676 | 777-77-7777 | 105000 | 3 |
| 510h | 78787 | 888-88-8888 | 60000 | 5 |
| 510i | 89898 | 999-99-9999 | 35000 | 5 |

Figure 5

SYSTEM, METHOD AND COMPUTER-READABLE MEDIUM FOR DYNAMIC SKEW AVOIDANCE FOR GENERIC QUERIES

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost, e.g., response time, as determined by an optimizer. The response time is the amount of time it takes to complete the execution of a query on a given system.

In massively parallel processing (MPP) systems, dealing with data skew is critical to the performance of many applications. Partial redistribution, partial duplication (PRPD) mechanisms have been proposed for an optimizer to use when joining large tables where data skew is known to exist and the skewed data values are also known. For example, assume a join operation is to be performed on two relations that are evenly partitioned across all processing modules, e.g., Access Module Processors (AMPs), and none of the join attributes of either table are the respective tables' primary index, e.g., the values that are hashed to distribute the base table rows to the MPP AMPs. In such a situation, hash values are calculated on the attributes of the join operation, and the rows are redistributed to AMPs according to the hash values. In the event there is data skew in a column on which the join operation is applied, the hash redistribution of the rows to complete the join operation will result in an AMP receiving an excessive number of rows compared to other AMPs involved in the join operation. As referred to herein, an AMP or other processing module having an excessive load distributed thereto with respect to other AMPs or processing modules is referred to as a hot AMP. In such a situation, processing of the query may demonstrate a relatively slow response time due to the excessive load and system resource usage at the hot AMP, and consequently processing of the operation may exhibit a low overall system parallel efficiency. An AMP may receive significantly more table rows on which the query is applied due to various causes, such as a natural demographic data skew, e.g., high biased values, skew resulting from null values, or various other causes. Adding additional nodes or AMPs may decrease the overall parallel efficiency since adding more nodes may result in distribution of less rows to each non-hot AMP thereby producing a greater relative disproportionate distribution of rows to the hot AMP.

The avoidance of highly skewed data is extremely important to queries executed on any shared nothing parallel system. The PRPD mechanism mentioned above has been implemented to use when joining two large tables where data skew is known and the skewed data values are also known. Further, mechanisms have been implemented that extend the PRPD approach to a dynamic scenario for joins. However, contemporary systems do not effectively provide for dynamic skew avoidance to generic skewed query problems considering all issues which include query selectivity, lack of data statistics, possible source skewed data, etc.

Consider a table R having attributes c1 and c2, where c1 is the primary index and c2 is a column which needs to be redistributed due to a query on R, e.g., a join of R.c2 to another table or a selection of some aggregate values grouped on R.c2. Further assume that R.c2 is highly skewed on a certain value which is not known before the query due to a lack of statistics or inaccurate statistics.

If traditional redistribution mechanisms are utilized, a single AMP will receive all the skewed values from R.c2 which may result in typical problems, such as slow response time, unbalanced workload, and/or out of spool errors. Further, by using a dynamic approach, if the hot AMP is detected too late, it may not facilitate optimization in any manner. Still further, contemporary mechanisms do not consider the query selectivity, and thus mistakes may be made in detecting the hot AMP. Still further, even if the skewed valued of R.c2 is appropriately detected, if the attribute c1 is also skewed on a certain hot AMP "A", the AMP A will still be hot even if the skewed R.c2 values are maintained locally.

Therefore, what is needed is a mechanism that overcomes the described problems and limitations.

SUMMARY

Disclosed embodiments provide a system, method, and computer readable medium that facilitate dynamic skew avoidance. The disclosed mechanisms advantageously do not require any statistic information regarding which values are skewed in a column on which a query is applied. Query selectivity is evaluated at a check point and thereby facilitates accurate detection of an overloaded (hot) processing module (AMP as referred before). The successful detection of an overloaded processing module causes other processing modules to stop sending more skewed rows to the overloaded processing module. Detection of an overloaded processing module is made when the overloaded processing module has received more rows than a target number of rows. Further, skewed rows that are maintained locally rather than redistributed to a detected overloaded processing module may result in more processing modules becoming overloaded. Advantageously, the disclosed mechanisms provide for a final redistribution adjustment to provide for even distribution of rows among all processing modules.

BRIEF DESCRIPTION OF THE DRAWINGS

Aspects of the present disclosure are best understood from the following detailed description when read with the accompanying figures, in which:

FIG. 5 is a diagrammatic representation of a portion of an exemplary table on which mechanisms for skew avoidance may be implemented in accordance with disclosed embodiments;

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

In accordance with disclosed embodiments, mechanisms for dynamic skew avoidance are provided. Query selectivity is evaluated at a check point and thereby facilitates accurate detection of a processing module that is receiving more than a desired portion of rows of a table on which a query is applied. The successful detection of an overloaded processing module results in other processing modules to locally maintain the skewed rows rather than sending the skewed rows to the overloaded processing module. Skewed rows that are maintained locally rather than redistributed to a detected overloaded processing module may result in more processing modules becoming overloaded. Advantageously, the disclosed embodiments provide for a redistribution adjustment routine to provide for even distribution of rows among all processing modules.

Figure 1:
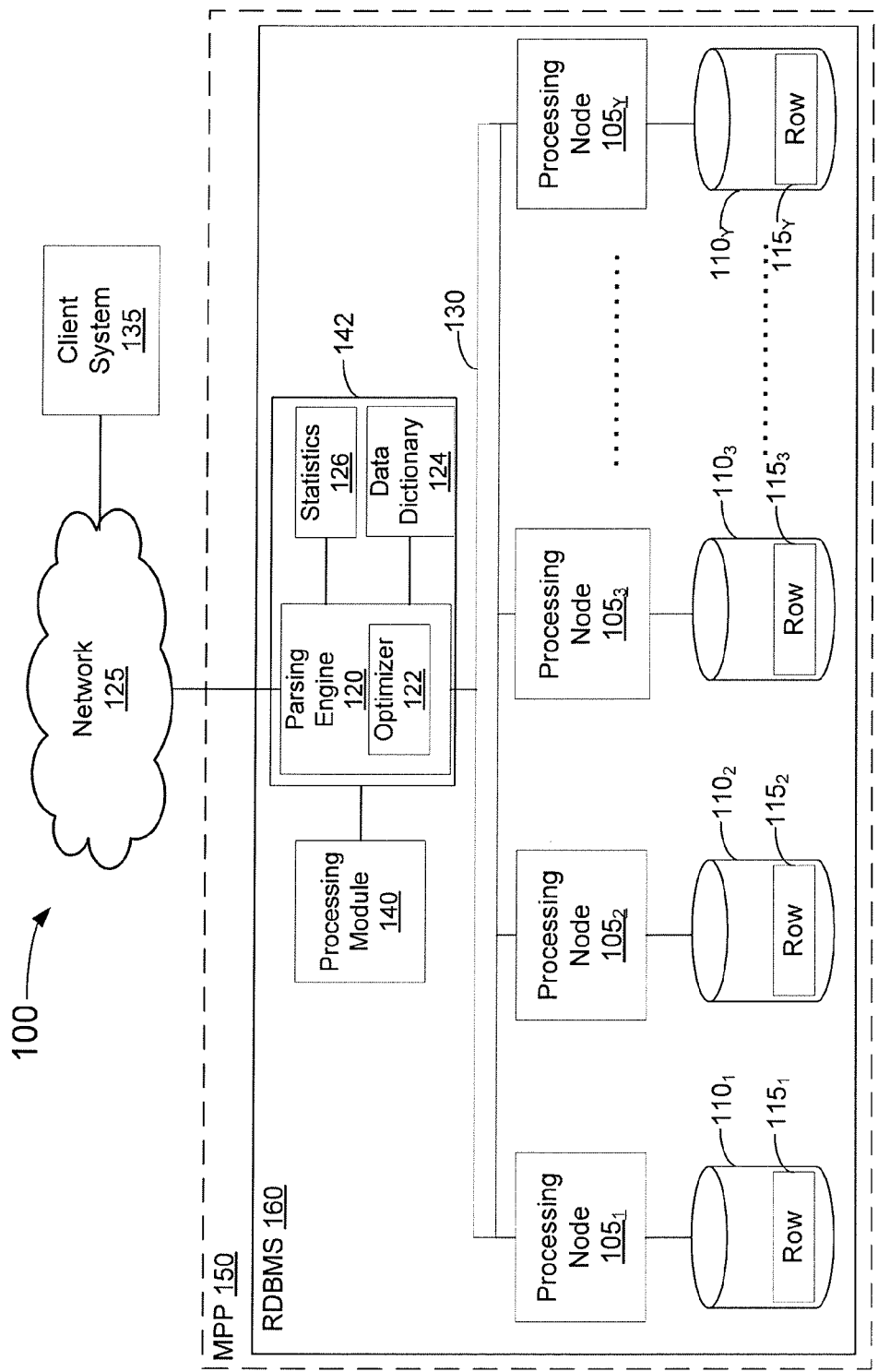
FIG. 1 depicts a diagrammatic representation of an exemplary architecture for a large database system that is suited for implementing mechanisms for skew avoidance in accordance with disclosed embodiments.

FIG. 1 depicts a diagrammatic representation of an exemplary architecture for a large database system 100, such as a Teradata Active Data Warehousing System, that is suited for implementing mechanisms for skew avoidance in accordance with disclosed embodiments. The database system 100 includes a relational database management system (RDBMS) 160 built upon a massively parallel processing (MPP) system 150.

As shown, the database system 100 includes one or more processing nodes $105_{1 \ldots Y}$ that manage the storage and retrieval of data in data-storage facilities $110_{1 \ldots Y}$. Each of the processing nodes may host one or more physical or virtual processing modules, such as one or more access module processors (AMPs). Each of the processing nodes $105_{1 \ldots Y}$ manages a portion of a database that is stored in a corresponding one of the data-storage facilities $110_{1 \ldots Y}$. Each of the data-storage facilities $110_{1 \ldots Y}$ includes one or more disk drives or other storage medium.

The system stores data in one or more tables in the data-storage facilities $110_{1 \ldots Y}$. The rows $115_{1 \ldots Y}$ of the tables are stored across multiple data-storage facilities $110_{1 \ldots Y}$ to ensure that the system workload is distributed evenly across the processing nodes $105_{1 \ldots Y}$. A parsing engine 120 organizes the storage of data and the distribution of table rows $115_{1 \ldots Y}$ among the processing nodes $105_{1 \ldots Y}$ and accesses processing nodes $105_{1 \ldots Y}$ via an interconnect 130. The parsing engine 120 also coordinates the retrieval of data from the data-storage facilities $110_{1 \ldots Y}$ in response to queries received from a user, such as one using a client computer system 135 connected to the database system 100 through a network 125 connection. The parsing engine 120, on receiving an incoming database query, applies an optimizer 122 component to the query to assess the best plan for execution of the query. Selecting the optimal query-execution plan includes, among other things, identifying which of the processing nodes $105_{1 \ldots Y}$ are involved in executing the query and which database tables are involved in the query, as well as choosing which data-manipulation techniques will serve best in satisfying the conditions of the query. To this end, the parser and/or optimizer may access a data dictionary 124 that specifies the organization, contents, and conventions of one or more databases. For example, the data dictionary 124 may specify the names and descriptions of various tables maintained by the MPP system 150 as well as fields of each database. Further, the data dictionary 124 may specify the type, length, and/or other various characteristics of the stored tables. The optimizer may utilize statistics 126 for making query assessments during construction of the query-execution plan. For example, database statistics may be used by the optimizer to determine data demographics, such as attribute minimum and maximum values and data ranges of the database. The database system typically receives queries in a standard format, such as the Structured Query Language (SQL) put forth by the American National Standards Institute (ANSI). The parsing engine 120, the data dictionary 124, and the statistics 126 may be implemented as computer-executable instruction sets tangibly embodied on a computer-readable medium, such as a memory device 142, that are retrieved by a processing module 140 and processed thereby.

Figure 2:
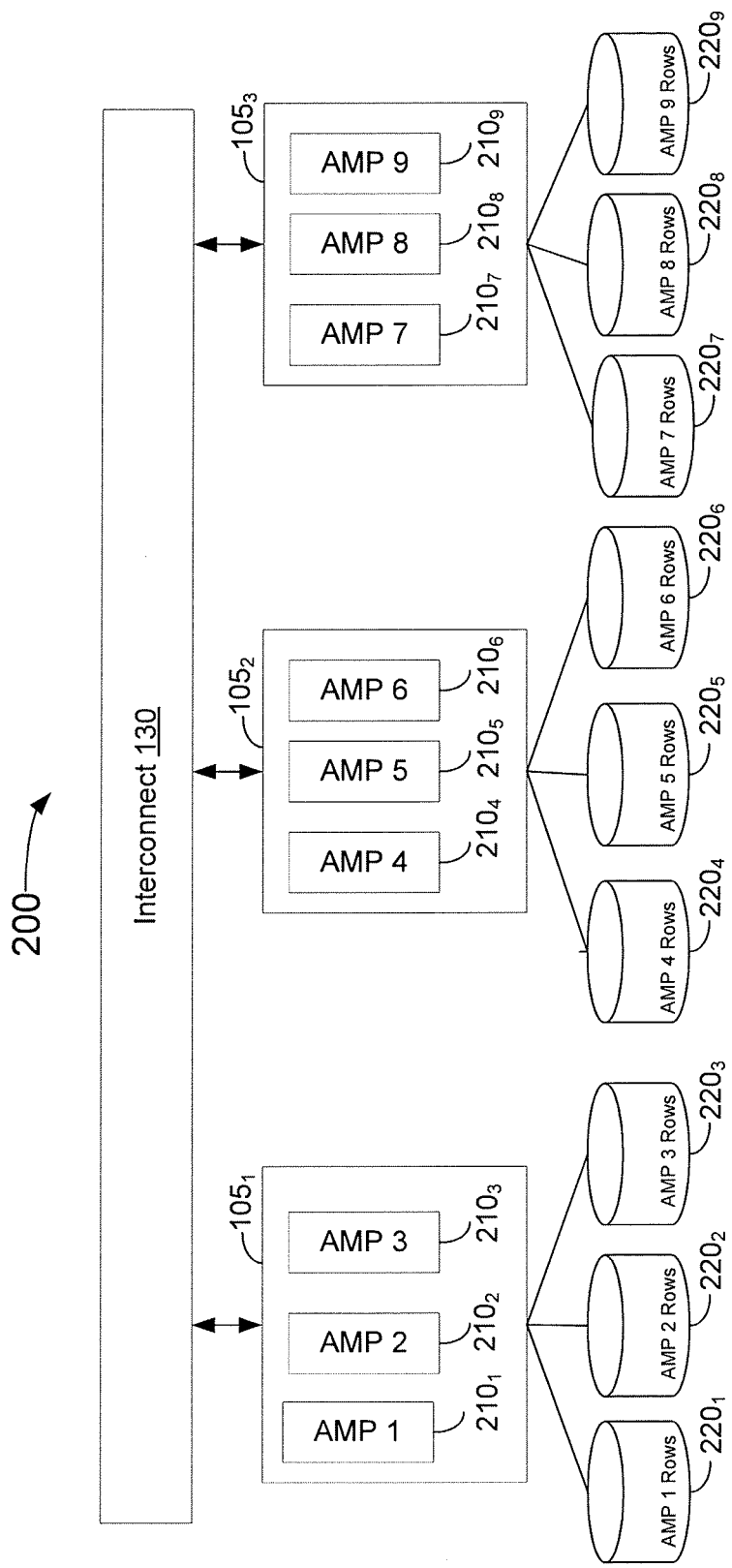
FIG. 2 is a diagrammatic representation of a massively parallel processing system configuration suitable for implementing mechanisms for skew avoidance in accordance with disclosed embodiments.

FIG. 2 is a diagrammatic representation of an MPP configuration 200 suitable for implementing mechanisms for skew avoidance in accordance with disclosed embodiments. In the illustrative example, each of the processing nodes $105_1$-$105_3$ are each configured with three respective AMPs $210_1$-$210_9$. The rows $115_{1 \ldots Y}$ depicted in FIG. 1 have been distributed across the nine AMPs $210_1$-$210_9$ hosted by processing nodes $105_1$-$105_3$ such that each of the AMPs is allocated rows $220_1$-$220_9$. For example, the rows $115_{1 \ldots Y}$ may be distributed or partitioned across the data-storage facilities $110_{1 \ldots Y}$ by the parsing engine 120 in accordance with their primary index. The primary index defines the columns of the rows that are used for calculating a hash value. A hash function produces hash values from the values in the columns specified by the primary index. Some portion, possibly the entirety, of the hash value is designated a "hash bucket". The hash buckets are assigned to data-storage facilities $110_{1 \ldots Y}$ and associated processing modules, such as AMPs $210_{1 \ldots 9}$, by a hash bucket map. The characteristics of the columns chosen for the primary index determine how evenly the rows are distributed.

Figure 3:
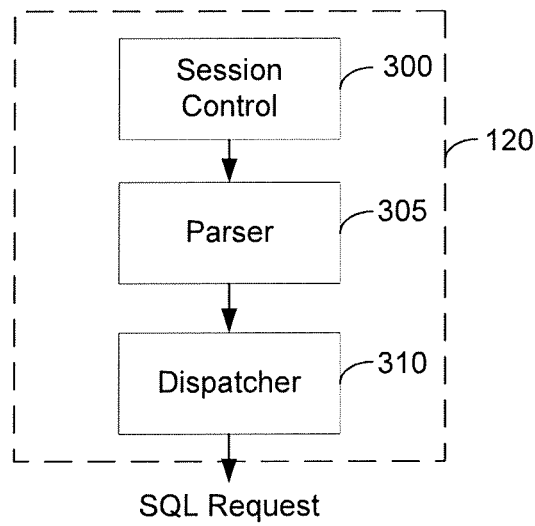
FIG. 3 is a diagrammatic representation of a parsing engine implemented in accordance with an embodiment.
Figure 4:
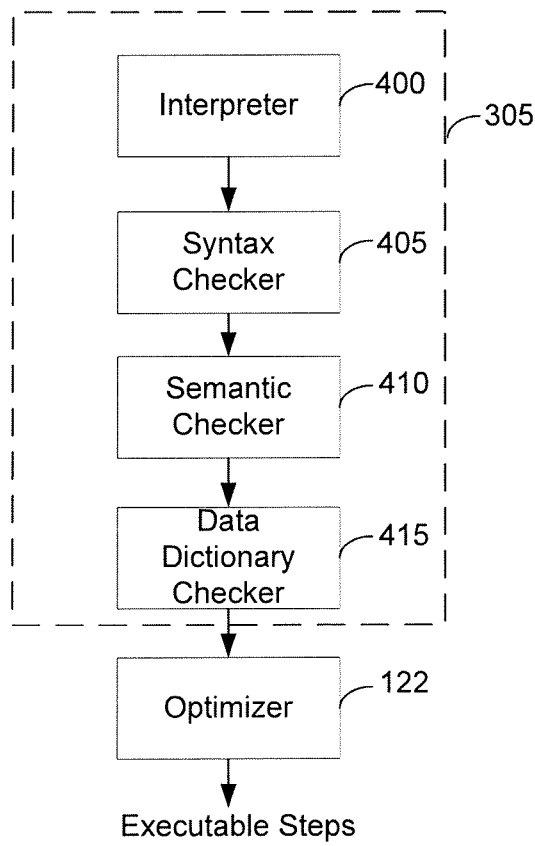
FIG. 4 is a diagrammatic representation of a parser implemented in accordance with an embodiment.

In one example system, the parsing engine 120 is made up of three components: a session control 300, a parser 305, and a dispatcher 310 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults the data dictionary 124 depicted in FIG. 1 to ensure that all of the objects specified in the SQL request exist and that the user has the authority to perform the request (block 415). Finally, the parser 305 runs the optimizer 122 that selects the least expensive plan to perform the request and submits the query steps to the dispatcher 310 for distribution to the AMPs involved in processing of the query.

FIG. 5 is a diagrammatic representation of a portion of an exemplary table 500 on which mechanisms for skew avoidance may be implemented in accordance with disclosed embodiments. Table 500 comprises a plurality of records 510a-510i (collectively referred to as records 510) and fields 520a-520d (collectively referred to as fields 520). Each record 510 comprises data elements in respective fields, or attributes, 520. In the present example, table 500 has a table name "Employee" and includes fields 520 having respective labels of "Employee_No", "SS_Num", "Salary", and "Plan."

For illustrative purposes, assume a query is to be executed that includes a predicate applied on the Plan attribute of the Employee table 500. Further assume that at least one value of the Plan attribute is skewed, and that rows of the Employee table are originally hash distributed across a plurality of AMPs based on an index excluding the Plan attribute, e.g., the Employee_No attribute. Thus, to perform the query, rows of the Employee table 500 may be redistributed among a plurality of AMPs based on hash values of the Plan attribute. Consequently, a particular AMP may receive significantly more rows of the Employee table 500 than other AMPs due to the skewed value in the Plan column 520d. An AMP or other processing module that receives, or is otherwise allocated, significantly more rows of a table involved in a query is referred to herein as a hot AMP. In accordance with disclosed embodiments, data skew may be dynamically detected by identifying a hot AMP, and redistribution of table rows may be adjusted to advantageously provide for more balanced loading of AMPs or other processing modules involved in processing of the query.

In accordance with disclosed embodiments, dynamic skew avoidance mechanisms provide a check point to evaluate query selectivity. Preferably, the checkpoint is implemented as early as possible during the query execution to correctly detect the query selectivity. For example, suppose ten-thousand rows are processed after which a first check point is performed. Assume one-thousand rows of the ten-thousand processed satisfy the query condition and are redistributed. In this instance, the query selectivity is detected as 10%.

Given the selectivity, a target number of rows desired to be redistributed for each AMP is determined. If a particular AMP becomes hot, future redistributions to this AMP are stopped. For rows that would be redistributed to the hot AMP after the AMP is detected as hot, the rows are maintained locally at the AMP(s) that would redistribute them to the hot AMP. After redistribution is complete, if any AMP(s) is still hot, rows are then randomly redistributed from the hot AMP(s) to any AMP which has not received the target number of rows in the system.

Figure 6:
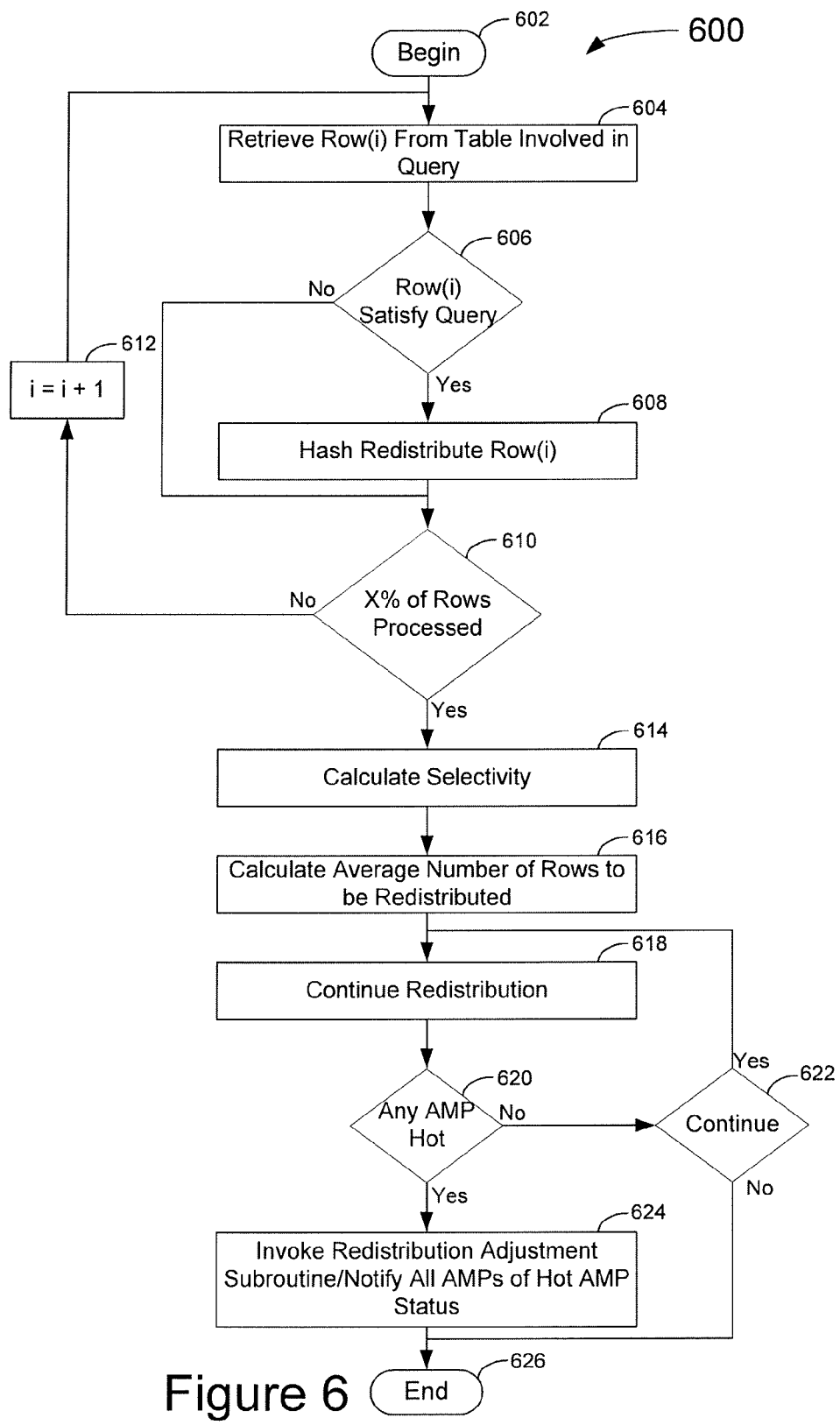
FIG. 6 is a flowchart that depicts processing of a dynamic skew detection routine that facilitates skew avoidance for processing of generic queries implemented in accordance with an embodiment.

FIG. 6 is a flowchart 600 that depicts processing of a dynamic skew detection routine that facilitates skew avoidance when processing generic queries implemented in accordance with an embodiment. The processing steps of FIG. 6 may be implemented as computer-executable instructions tangibly embodied on a computer-readable medium executable by a processing system, such as one or more of the AMPs $210_1$-$210_9$ depicted in FIG. 2.

The skew detection routine is invoked (step 602), e.g., upon invocation of query processing. A row(i) is then retrieved from the table on which the query is applied (step 604), and an evaluation is made to determine if the retrieved row(i) satisfies the query condition (step 606). If not, the dynamic skew detection routine may proceed to evaluate if a predetermined percentage (X %) of rows of the table have been processed (step 610). The predetermined percentage, X %, defines the checkpoint at which query selectivity is evaluated as described more fully hereinbelow. If the retrieved row satisfies the query, the row(i) is hash redistributed to an AMP (step 608), and an evaluation is then made to determine if a particular percentage (X %) of rows of the table have been processed according to step 610. If the specified percentage of rows have not been processed, a row index, i, may be incremented (step 612), and the next row(i) may be retrieved from the table involved in the query according to step 604.

When the specified percentage of rows of the table involved in the query has been processed, a selectivity value is then calculated (step 614). For instance, the selectivity (s) may be calculated according to the following:

$$s = \text{rows redistributed/rows processed} \quad \text{equation 1}$$

In this instance, the selectivity is calculated as the quotient of the rows that have been redistributed and the rows that have been processed.

In accordance with an embodiment, the number of AMPs, or other processing nodes, that are involved in processing the query is known. Thus, given the selectivity, s, an ideal average number of rows, a, to be distributed, or otherwise allocated, per AMP may be calculated (step 616), e.g., according to the following:

$$a = N^*s/A \quad \text{equation 2}$$

where N is the number of rows in the table, and A is the number of AMPs involved in processing of the query.

Rows that are retrieved for query processing are continued to be redistributed (step 618), and an evaluation may periodically be made to determine if any AMP involved in the query processing is identified as hot or otherwise overloaded (step 620).

An AMP(i) may be detected as hot if the number of rows received on the AMP(i), $RR_i$, exceeds the target number of rows, T, where:

$$T = a^*(1+e) \quad \text{equation 3}$$

where a is the ideal average number of rows to be received by each AMP as described above, and e specifies a tolerable skew in the final distribution. For example, a skew of 10% may be specified as tolerable, and thus e would be set to a value of 0.1.

If no AMP has been identified as hot, an evaluation may be made to determine if processing of the query is to continue (step 622), i.e., if any table rows remain for processing. If so, processing may continue for redistribution of rows according to step 618. If not, the dynamic skew detection routine cycle may end (step 626).

Returning again to step 620, if an AMP is identified as hot, a redistribution adjustment subroutine may then be invoked, and all AMPs involved in processing of the query may be notified of the hot AMP status (step 624), e.g., each of the other AMPs involved in processing of the query may be notified of the identity of the hot AMP. The dynamic skew detection routine cycle may then end according to step 626.

Figure 7:
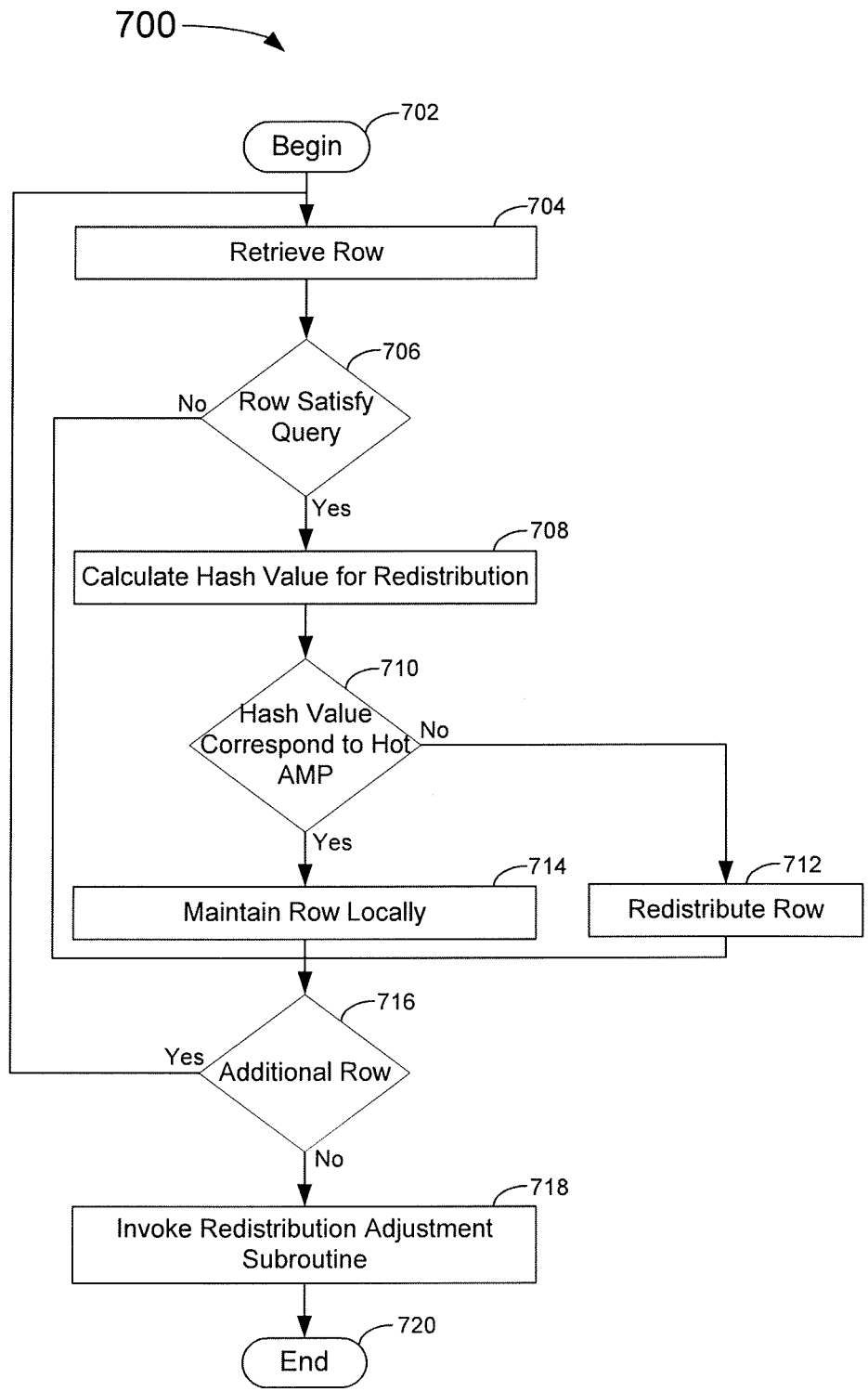
FIG. 7 is a flowchart that depicts processing of a row redistribution routine when a hot processing module has been detected that facilitates skew avoidance for processing of generic queries implemented in accordance with an embodiment.

FIG. 7 is a flowchart 700 that depicts processing of a row redistribution routine when a hot, or overloaded, AMP has been detected that facilitates skew avoidance when processing generic queries implemented in accordance with an embodiment. The processing steps of FIG. 7 may be implemented as computer-executable instructions tangibly embodied on a computer-readable medium executable by a processing system, such as one or more of the AMPs $210_1$-$210_9$ depicted in FIG. 2.

The redistribution routine is invoked (step 702), e.g., upon detection of a hot AMP at step 620 of FIG. 6, and a row is retrieved (step 704). The row is then evaluated to determine if it satisfies the query (step 706). If not, the redistribution routine proceeds to evaluate whether an additional row remains for evaluation (step 716).

Returning again to step 706, if the row satisfies the query, a hash value, or other suitable redistribution mechanism, is calculated (step 708). The hash value is then evaluated to determine if it corresponds to an AMP that has been identified as hot (step 710). If not, the row is redistributed to the AMP corresponding to the hash value (step 712), and an evaluation is then made to determine if another row remains for evaluation according to step 716. If the hash is identified as corresponding to a hot AMP at step 710, the row is maintained locally by the AMP (step 714) rather than being redistributed to the hot AMP, and an evaluation is then made to determine if another row remains for evaluation according to step 716.

If it is determined that an additional row remains for evaluation at step 716, the redistribution routine may then return to step 704 to retrieve the next row. If no additional rows remain for evaluation, the redistribution routine may then invoke a redistribution adjustment routine (step 718) as described more fully hereinbelow with reference to FIG. 8, and the redistribution routine cycle may then end (step 720).

Figure 8:
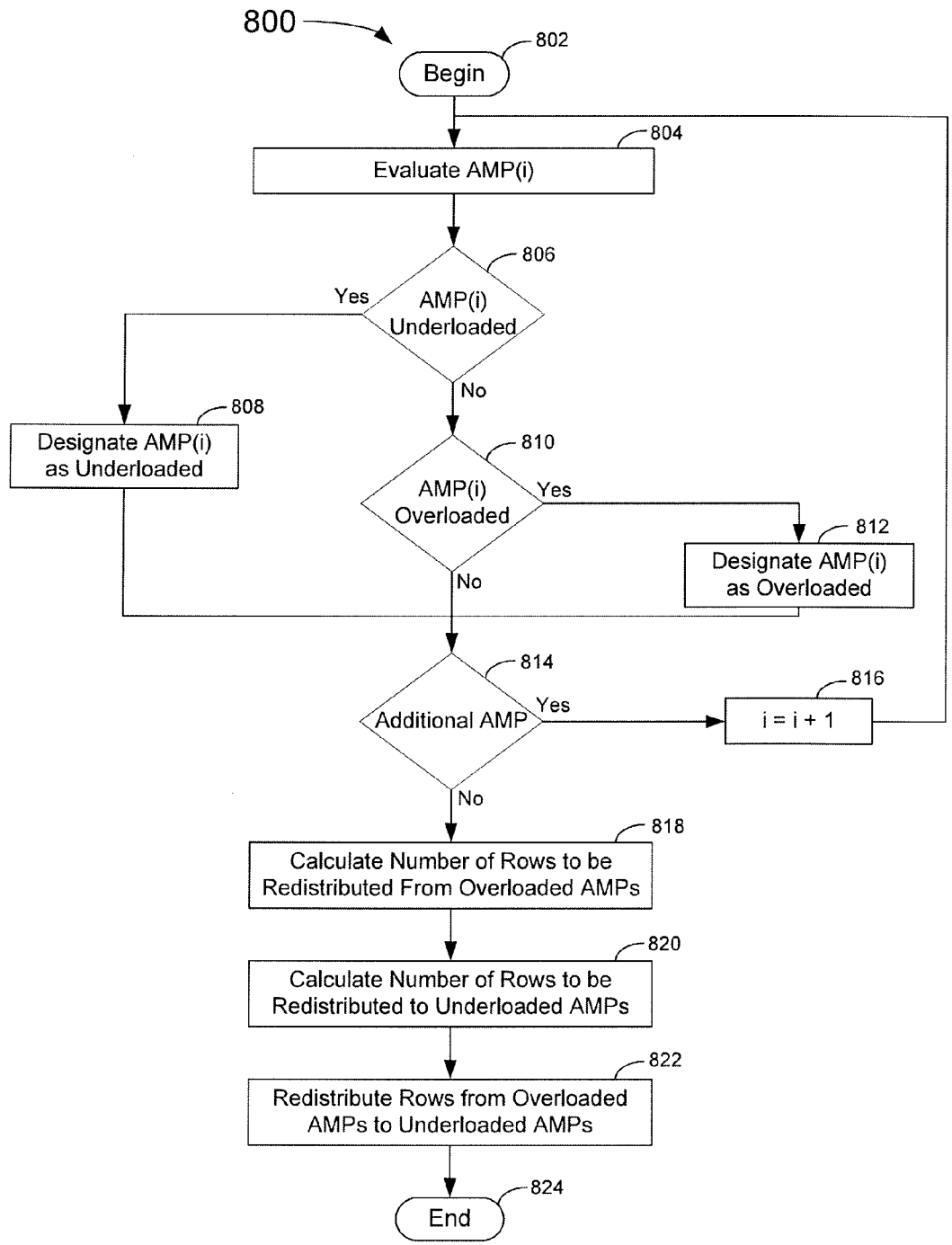
FIG. 8 is a flowchart that depicts processing of a redistribution adjustment subroutine implemented in accordance with an embodiment.

FIG. 8 is a flowchart 800 that depicts processing of a redistribution adjustment subroutine implemented in accordance with an embodiment. The processing steps of FIG. 8 may be implemented as computer-executable instructions tangibly embodied on a computer-readable medium executable by a processing system, such as one or more of the AMPs $210_1$-$210_9$ depicted in FIG. 2.

The redistribution adjustment subroutine is invoked (step 802), e.g., at step 718 of FIG. 7, and a first AMP(i) is evaluated for the quantity of rows of the table redistributed thereto and/or maintained locally thereby (step 804). An evaluation may then be made to determine if the AMP(i) is underloaded (step 806). If so, the AMP(i) is designated as underloaded (step 808), and an evaluation is then made to determine if another AMP remains for evaluation (step 814). Returning again to step 806, if the AMP(i) is not underloaded, an evaluation may then be made to determine if the AMP(i) is overloaded (step 810), e.g., if the number of rows redistributed and/or maintained locally by the AMP(i) exceeds the target number of rows as calculated according to equation 3 as described above. If so, the AMP(i) may be designated as overloaded (step 812), and an evaluation may then be made to determine if another AMP remains for evaluation according to step 814. If, at step 810, the AMP(i) is not evaluated as overloaded, an evaluation may then be made to determine if another AMP remains for evaluation according to step 814.

If another AMP remains to be evaluated at step 814, an AMP index, i, may then be incremented (step 816), and processing may return to step 804 to evaluate the AMP(i) load. However, in practice, all AMPs are processed in parallel, so step 814 and 818 are not necessary in such a parallel MPP system. When no additional AMPs remain to be evaluated, the number of rows to be redistributed from overloaded AMPs may then be calculated (step 818), and, likewise, the number of rows to be redistributed to underloaded AMPs may be calculated (step 820). Rows may then be redistributed from the overloaded AMPs to the underloaded AMPs accordingly (step 822). The redistribution adjustment subroutine cycle may then end (step 824).

As an example, consider a 4-AMP (designated AMPs "A1"-"A4") system with a target number of rows, T, of one-thousand, and a tolerable skew, e, of 0.1 for a tolerable load ($Total_a$) of one-thousand one-hundred rows per AMP. Thus, each AMP can tolerate one-thousand one-hundred rows without being evaluated as overloaded. Consider the row distribution prior to the redistribution adjustment as specified by table 1 below, where $RR_a$ specifies the number of rows received by the corresponding AMP due to redistribution from other AMPs, and $RL_a$ specifies the number of rows that have been maintained locally by the corresponding AMP as a result of identification of another AMP(s) as hot:

TABLE 1

|    | $RR_a$ | $RL_a$ | $Total_a$ | $Extra_a$ ($Total_a$ − T) |
|----|--------|--------|-----------|---------------------------|
| A1 | 0.9k   | 0.3k   | 1.2k      | 0.1k                      |
| A2 | 0.8k   | 0.6k   | 1.4k      | 0.3k                      |
| A3 | 0.8k   | 0.1k   | 0.9k      | −0.2k                     |
| A4 | 0.5k   | 0      | 0.5k      | −0.6k                     |

For instance, in the above example, the AMP "A1" has received 900 rows as a result of redistribution, and has maintained 300 rows locally that would have been redistributed to another AMP but instead were maintained locally by AMP A1 due to identification of the AMP(s) to which the 300 rows were to be redistributed as hot. Thus, AMP A1 has a total of 1200 rows maintained thereby. In this instance, the AMP A1 is overloaded by an extra number of rows ($Extra_a$) of 100. Likewise, AMP A2 is overloaded by three-hundred rows. AMPs A3 and A4 are underloaded by two-hundred and six-hundred rows, respectively. Thus, the number of rows to be redistributed from AMPs A1 and A2 is calculated as one-hundred and three-hundred, respectively, according to step 818, and the number of rows to be redistributed to AMPs A3 and A4 is calculated as two-hundred and six-hundred, respectively, according to step 820.

The redistribution of rows from overloaded AMPs to underloaded AMPs according to step 822 is preferably made according to the extent of the underload of the AMPs A3 and A4. For instance, 75% of the rows to be redistributed as a result of the redistribution adjustment may be sent to AMP A4, and 25% of the rows may be sent to AMP A3 because AMP A4 can accept 3-times more rows than AMP A3 (0.6 k/0.2 k).

Ideally, if the table has a desirable primary index and there is no source skew, the redistribution adjustment will not be necessary. The purpose for the redistribution adjustment is to alleviate source skew problems wherein maintaining skewed rows locally still results in hot AMP(s).

After all the above processes, the preparation phase of the optimization is complete, and query execution steps may then be performed. Different methods may result depending on the type of query being performed. For example, if the query is to join one relation R to another relation S, then the relation S's corresponding non-skewed rows will be redistributed, and skewed rows will be duplicated. If, on the otherhand, the query is an aggregate grouping query, then a local aggregation may first be performed, and redistribution of aggregate temporary results to a global aggregation may be performed afterwards.

As described, mechanisms that facilitate dynamic skew avoidance are provided. The disclosed mechanisms advantageously do not require any statistic information regarding which values are skewed in a column on which a query is applied. Query selectivity is evaluated at a check point and thereby facilitates accurate hot AMP detection. The successful detection of a hot AMP causes other AMPs to stop sending more skewed rows to the hot AMP. Detection of a hot AMP is made when the hot AMP has received more rows than a target number of rows. Skewed rows that are maintained locally rather than redistributed to a detected hot AMP may result in more AMPs becoming hot or overloaded. Advantageously, the disclosed mechanisms provide for a final redistribution adjustment to provide for even distribution of rows among all AMPs.

The flowcharts of FIGS. 6-8 depict process serialization to facilitate an understanding of disclosed embodiments and are not necessarily indicative of the serialization of the operations being performed. In various embodiments, the processing steps described in FIGS. 6-8 may be performed in varying order, and one or more depicted steps may be performed in parallel with other steps. Additionally, execution of some processing steps of FIGS. 6-8 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method that facilitates skew avoidance when processing a query by a plurality of processing modules, comprising:
   receiving, by the plurality of processing modules, the query to be processed, wherein each of the plurality of processing modules has a respective subset of rows of a table on which the query is applied allocated thereto;
   processing the query, by the plurality of processing modules, a predefined percentage of the respective subset of rows allocated thereto;
   upon completion of processing of the predefined percentage of the respective subset of rows associated with the query, calculating a selectivity that specifies an amount of the predefined percentage of the respective rows that satisfy the query;
   calculating based on the calculated selectivity of the respective rows that satisfy the query, a target number of rows that specifies a maximum number of rows to be redistributed to each of the plurality of processing modules;
   upon completion of processing each of the respective subset of rows, determining if any of the plurality of processing modules has received a number of rows of the table that exceeds the target number of rows;
   responsive to completing processing of all rows of the table, evaluating each of the plurality of processing modules to respectively determine if each processing module is overloaded or underloaded with respect to the number of rows that satisfy the query respectively maintained by the processing modules; and
   redistributing rows from any processing module identified as overloaded to at least one processing module identified as underloaded such that each of the plurality of processing modules has a number of rows that does not exceed the target number of rows.

2. The method of claim 1, wherein the selectivity comprises a quotient of a number of the rows that have satisfied the query and a number of the respective subset of rows that have been processed.

3. The method of claim 1, wherein determining if any of the processing modules has received a number of rows of the table that exceeds the target number of rows comprises determining a first processing module has received a number of rows of the table that exceeds the target number of rows.

4. The method of claim 3, further comprising notifying each of the plurality of processing modules that the first processing module has received a number of rows of the table that exceeds the target number of rows.

5. The method of claim 4, further comprising responsive to receiving notification that the first processing module has received a number of rows of the table that exceeds the target number of rows, maintaining locally, by each of the plurality of processing modules, any row of the respective subset of rows of the table that satisfies the query that would be redistributed to the first processing module.

6. A non-transient computer-readable medium that includes computer-executable instructions for execution by a processing system, the computer-executable instructions for facilitating skew avoidance when processing a query by a plurality of processing modules in the processing system, the computer-executable instructions, when executed, cause the processing system to:
   receive, by the plurality of processing modules, the query to be processed, wherein each of the plurality of processing modules has a respective subset of rows of a table on which the query is applied allocated thereto;

process the query, by the plurality of processing modules, a predefined percentage of the respective subset of rows allocated thereto;

upon completion of processing of the predefined percentage of the respective subset of rows associated with the query, calculate a selectivity that specifies an amount of the predefined percentage of the respective rows that satisfy the query;

calculate based on the calculated selectivity of the respective rows that satisfy the query, a target number of rows that specifies a maximum number of rows to be redistributed to each of the plurality of processing modules;

upon completion of processing each of the respective subset of rows, determine if any of the plurality of processing modules has received a number of rows of the table that exceeds the target number of rows;

responsive to completing processing of all rows of the table, evaluate each of the plurality of processing modules to respectively determine if each processing module is overloaded or underloaded with respect to the number of rows that satisfy the query respectively maintained by the processing modules; and redistribute rows from any processing module identified as overloaded to at least one processing module identified as underloaded such that each of the plurality of processing modules has a number of rows that does not exceed the target number of rows.

7. The non-transient computer-readable medium of claim 6, wherein the selectivity comprises a quotient of a number of the rows that have satisfied the query and a number of the respective subset of rows that have been processed.

8. The non-transient computer-readable medium of claim 6, wherein the instructions that, when executed, determine if any of the processing modules has received a number of rows of the table that exceeds the target number of rows comprise instructions that, when executed, cause the processing system to determine a first processing module has received a number of rows of the table that exceeds the target number of rows.

9. The non-transient computer-readable medium of claim 8, further comprising instructions that, when executed, cause the processing system to notify each of the plurality of processing modules that the first processing module has received a number of rows of the table that exceeds the target number of rows.

10. The non-transient computer-readable medium of claim 9, further comprising instructions that, when executed, cause the processing system to, responsive to receiving notification that the first processing module has received a number of rows of the table that exceeds the target number of rows, maintain locally, by each of the plurality of processing modules, any row of the respective subset of rows of the table that satisfies the query that would be redistributed to the first processing module.

11. The non-transient computer-readable medium of claim 6, further comprising instructions that, when executed, cause the processing system to, responsive to completing processing of all rows of the table, evaluate each of the plurality of processing modules to respectively determine if each processing module is overloaded or underloaded with respect to the number of rows that satisfy the query respectively maintained by the processing modules.

12. The non-transient computer-readable medium of claim 11, further comprising instructions that, when executed, cause the processing system to redistribute rows from any processing module identified as overloaded to at least one processing module identified as underloaded such that each of the plurality of processing modules has a number of rows that does not exceed the target number of rows.

13. A processing system configured to facilitate skew avoidance when processing a query by the processing system, comprising:

at least one storage facility on which a database table is stored; and a plurality of processing modules that receive the query to be processed, wherein each of the plurality of processing modules has a respective subset of rows of a table on which the query is applied allocated thereto, process the query, a predefined percentage of the respective subset of rows allocated thereto, upon completion of processing of the predefined percentage of the respective subset of rows associated with the query, calculate a selectivity that specifies an amount of the predefined percentage of the respective rows that satisfy the query, calculate based on the calculated selectivity of the respective rows that satisfy the query, a target number of rows that specifies a maximum number of rows to be redistributed to each of the plurality of processing modules, upon completion of processing each of the respective subset of rows, determine if any of the plurality of processing modules has received a number of rows of the table that exceeds the target number of rows;

responsive to completing processing of all rows of the table, evaluate each of the plurality of processing modules to respectively determine if each processing module is overloaded or underloaded with respect to the number of rows that satisfy the query respectively maintained by the processing modules, and redistribute rows from any processing module identified as overloaded to at least one processing module identified as underloaded such that each of the plurality of processing modules has a number of rows that does not exceed the target number of rows.

14. The system of claim 13, wherein the selectivity comprises a quotient of a number of the rows that have satisfied the query and a number of the respective subset of rows that have been processed.

15. The system of claim 13, wherein at least one of the plurality of processing modules determines a first processing module has received a number of rows of the table that exceeds the target number of rows.

16. The system of claim 15, wherein each of the plurality of processing modules are notified that the first processing module has received a number of rows of the table that exceeds the target number of rows.

17. The system of claim 16, wherein, responsive to receiving notification that the first processing module has received a number of rows of the table that exceeds the target number of rows, each of the plurality of processing modules locally maintains any row of the respective subset of rows of the table that satisfies the query that would be redistributed to the first processing module.

18. The system of claim 13, wherein, responsive to completing processing of all rows of the table, each of the plurality of processing modules are evaluated to respectively determine if each processing module is overloaded or underloaded with respect to the number of rows that satisfy the query respectively maintained by the processing modules.

* * * * *